US008062412B2

(12) United States Patent
Aoyama et al.

(10) Patent No.: US 8,062,412 B2
(45) Date of Patent: Nov. 22, 2011

(54) WATER-BASED INK FOR INK-JET RECORDING, INK CARTRIDGE AND INK-JET RECORDING APPARATUS

(75) Inventors: Michiko Aoyama, Nagoya (JP); Yasuhiro Taga, Nagoya (JP); Kenta Hayashida, Inazawa (JP); Mitsunori Maeda, Nagoya (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 0 days.

(21) Appl. No.: 12/342,889

(22) Filed: Dec. 23, 2008

(65) Prior Publication Data

US 2009/0165675 A1 Jul. 2, 2009

(30) Foreign Application Priority Data

Dec. 28, 2007 (JP) ................................. 2007-338533

(51) Int. Cl.
*C09D 11/02* (2006.01)
(52) U.S. Cl. .................. 106/31.89; 106/31.6; 106/31.86
(58) Field of Classification Search ............... 106/31.89, 106/31.6, 31.86
See application file for complete search history.

(56) References Cited

U.S. PATENT DOCUMENTS

| 5,609,671 A | 3/1997 | Nagasawa |
| 5,837,045 A | 11/1998 | Johnson et al. |
| 6,454,846 B2 * | 9/2002 | Yatake ........................ 106/31.58 |
| 2003/0218661 A1 * | 11/2003 | Okada et al. .................. 347/100 |
| 2003/0236321 A1 | 12/2003 | Sano et al. |
| 2004/0227800 A1 * | 11/2004 | Ohira et al. ................... 347/100 |

FOREIGN PATENT DOCUMENTS

| GB | 2401872 A * | 11/2004 |
| JP | 08-003498 | 1/1996 |
| JP | 08-216403 | 8/1996 |
| JP | 2000-513396 | 10/2000 |
| JP | 2002-030237 | 1/2002 |
| JP | 2002-038061 | 2/2002 |
| JP | 2006-063322 | 3/2006 |

* cited by examiner

*Primary Examiner* — Emily Le
*Assistant Examiner* — Veronica F Faison
(74) *Attorney, Agent, or Firm* — Banner & Witcoff, Ltd.

(57) ABSTRACT

A water-based ink for ink-jet recording includes a self-dispersing pigment, water, a water-soluble organic solvent, and an acetylene glycol surfactant. An amount of the self-dispersing pigment (solid content) relative to a total amount of the ink is in a range of about 3.5 wt % to about 4.5 wt %. The water-soluble organic solvent includes glycerin and dipropylene glycol propyl ether, an amount of the glycerin relative to a total amount of the ink is in a range of about 15 wt % to about 25 wt %, and an amount of the dipropylene glycol propyl ether relative to a total amount of the ink is in a range of about 2.0 wt % to about 3.0 wt %. An amount of the acetylene glycol surfactant relative to a total amount of the ink is in a range of about 0.1 wt % to about 0.3 wt %.

6 Claims, 1 Drawing Sheet

WATER-BASED INK FOR INK-JET RECORDING, INK CARTRIDGE AND INK-JET RECORDING APPARATUS

CROSS-REFERENCE TO RELATED APPLICATION

This application claims priority from Japanese patent application No. 2007-338533 filed on Dec. 28, 2007. The entire subject matter of the Japanese patent application is incorporated herein by reference.

BACKGROUND

Conventionally, a water-based ink for ink-jet recording is used widely that comprises a coloring agent, water, a water-soluble organic solvent such as a humectant and a penetrant, and a surfactant. As the coloring agent, a water-soluble dye is used widely in terms of height of chroma, abundance of types, good in water solubility, and the like. However, an ink comprising the water-soluble dye is not sufficient in light resistance and water resistance of the recording material recorded using the ink. This problem may be solved by using pigments as the coloring agent. Specifically, an ink comprising pigments is good in light resistance and water resistance of recording material recorded using the ink. Further, in the ink, when an amount of the penetrant is increased, printing quality is improved. However, increase of the penetrant worsens evaporation characteristic of the ink and a compound derived from a material that forms an ink-jet recording apparatus may be eluted into the ink. Examples of the material that forms the ink-jet recording apparatus include a rubber member and an organic material member other than rubber material. Examples of the rubber member include a wiper and a cap. The wiper wipes a nozzle surface of an ink-jet head, for example. The cap blocks off the nozzle surface from the outside world, for example. When a compound derived from the rubber member is eluted into the ink, there is a possibility that the compound is deposited in the ink. When the compound is deposited, for example, a nozzle of the ink-jet head may be clogged. Further, in the ink, when an amount of the pigment (solid content) is increased, printing quality is improved. However, as in the case of the penetrant, increase of the solid content of the pigment worsens evaporation characteristic of the ink and a compound derived from a material that forms an ink-jet recording apparatus may be eluted into the ink. Further, ejection stability of the ink is affected by amounts of the humectant, the penetrant, and the surfactant and it may be worsened in some cases.

In order to solve the problems of the evaporation characteristic and the ejection stability, an ink is proposed, the flow characteristic thereof is controlled by adjusting viscosity. However, this ink does not solve the problem of the elution of the rubber member into the ink.

SUMMARY

A water-based ink for ink-jet recording comprises a self-dispersing pigment, water, a water-soluble organic solvent, and an acetylene glycol surfactant. An amount of the self-dispersing pigment (solid content) relative to a total amount of the ink is in a range of about 3.5 wt % to about 4.5 wt %. The water-soluble organic solvent comprises glycerin and dipropylene glycol propyl ether. An amount of the glycerin relative to a total amount of the ink is in the range of about 15 wt % to about 25 wt %, and an amount of the dipropylene glycol propyl ether relative to a total amount of the ink is in the range of about 2.0 wt % to about 3.0 wt %. An amount of the acetylene glycol surfactant relative to a total amount of the ink is in a range of about 0.1 wt % to about 0.3 wt %.

An ink cartridge comprises the water-based ink for ink-jet recording.

An ink-jet recording apparatus comprises the ink cartridge and an ink ejection unit. The water-based ink for ink-jet recording comprised in the ink cartridge is ejected from the ink ejection unit.

DETAILED DESCRIPTION

Figure 1:
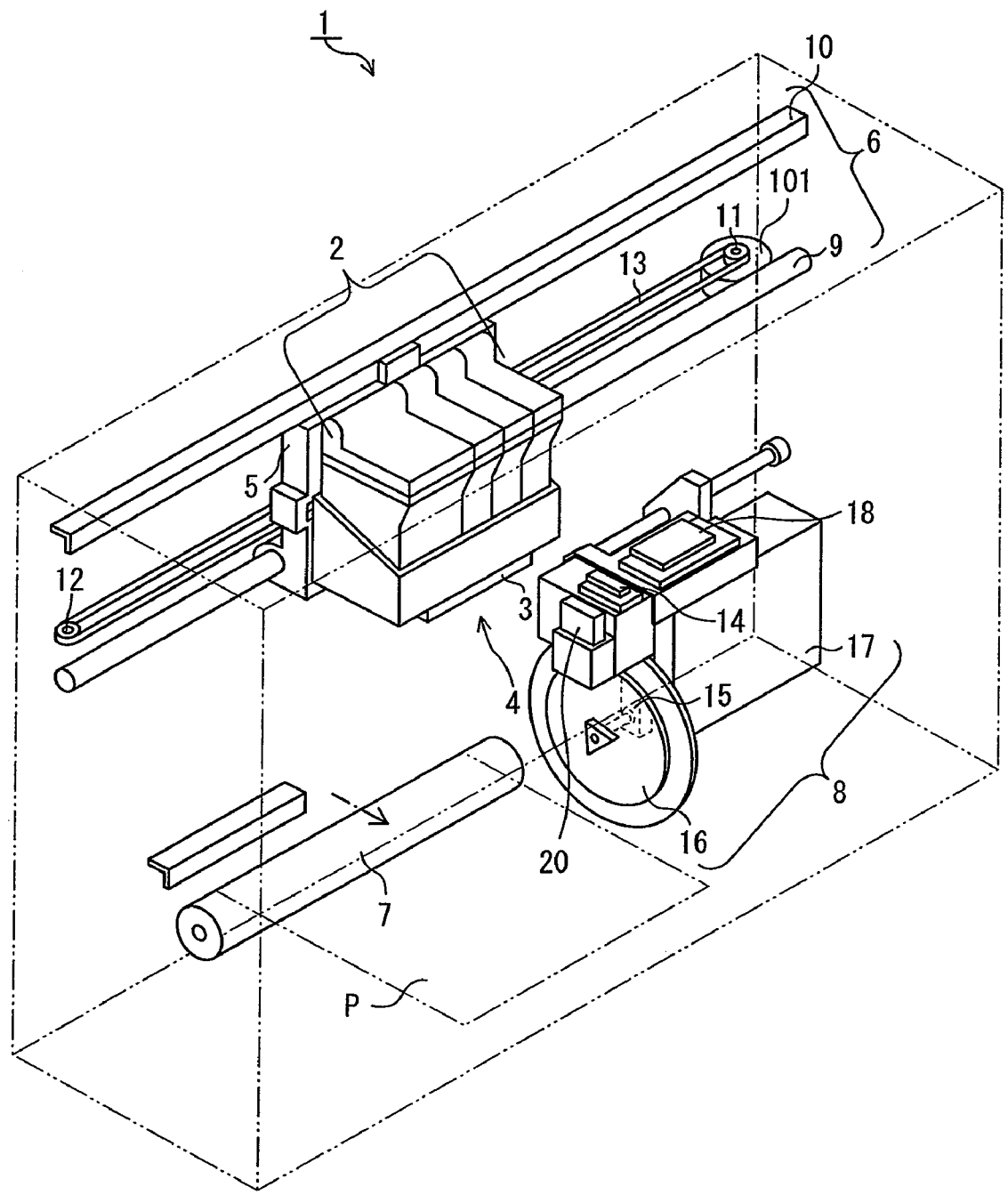
FIG. 1 is a schematic perspective view showing a construction of an example of an ink-jet recording apparatus.

In the water-based ink for ink-jet recording, the acetylene glycol surfactant may be an acetylene glycol surfactant represented by the following general formula (I).

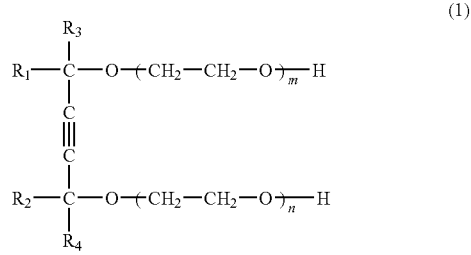

wherein in the general formula (I),
m and n may be the same or different and indicate numbers that satisfy $m+n=1$ to 15; and
$R_1$, $R_2$, $R_3$, and $R_4$ may be the same or different and are straight chain or branched-chain alkyl groups having 1 to 5 carbon atoms.

Application of the water-based ink for ink-jet recording is not limited and, for example, may be used as a water-based black ink.

Next, the water-based ink for ink-jet recording (hereinafter, also may simply be referred to as "water-based ink" or "ink") is explained. The water-based ink for ink-jet recording comprises a self-dispersing pigment, water, a water-soluble organic solvent, and an acetylene glycol surfactant.

The self-dispersing pigment may be dispersed into water without using a dispersant because at least one of a hydrophilic functional group such as a carboxyl group, a carbonyl group, a hydroxyl group, and a sulfone group and a salt thereof is directly introduced or introduced by a chemical bonding through a multivalent group.

The self-dispersing pigment is not limited. For example, a self-dispersing pigment, the surface thereof is treated by methods disclosed in JP-A Nos. H08-003498 and 2000-513396, may be used. The self-dispersing pigment may be a commercially available pigment, for example. Examples of the commercially available pigment include CAB-O-JET® 200, CAB-O-JET® 250, CAB-O-JET® 260, CAB-O-JET® 300, and CAB-O-JET® 700 manufactured by Cabot Specialty Chemicals, Inc.; BONJET® BLACK CW-1, BONJET® BLACK CW-2, and BONJET® BLACK CW-3 manufactured by Orient Chemical Industries, Ltd.; and LIOJET® WD BLACK 002C manufactured by TOYO INK MFG. CO., LTD. One of the self-dispersing pigments may be used alone or two or more of them may be used in combination.

Pigment that may be used as a raw material of the self-dispersing pigment is not limited and both inorganic pigment and organic pigment may be used. Examples of a pigment suitable for the surface treatment include carbon black manufactured by Mitsubishi Chemical Corporation such as MA8, MA100, and the like. Examples of the pigment also include carbon black manufactured by Degussa such as color black FW 200, and the like.

As described above, the amount of the self-dispersing pigment (solid content) relative to the total amount of the ink is in the range of about 3.5 wt % to about 4.5 wt %. Setting of the amount of the self-dispersing pigment (solid content) in the aforementioned range makes it possible to obtain an ink good in printing quality and evaporation characteristic. It is preferable that the ink comprises a high proportion of the self-dispersing pigment (solid content) within the aforementioned range because it thickens the printing density.

The water-based ink for ink-jet recording may comprise coloring agents other than the self-dispersing pigment as long as it does not undermine the advantage of the present invention. Examples of the coloring agent other than the self-dispersing pigment comprise dye and pigment other than the self-dispersing pigment.

The water may be ion-exchange water or purified water. An amount of the water relative to the total amount of the ink is defined suitably according to characteristics of the desired ink. The amount of the water may be a balance of the other components, for example.

The water-soluble organic solvent is classified into a humectant and a penetrant. The humectant prevents ink from drying at a tip of an ink-jet head, for example. The penetrant adjusts a drying rate of ink on a recording paper, for example.

The water-based ink for ink-jet recording comprises glycerin as the humectant. As described above, the amount of the glycerin relative to the total amount of the ink is in the range of about 15 wt % to about 25 wt %.

The humectant may be composed of glycerin only or may further comprise other humectants as long as it does not undermine the advantage of the present invention.

The humectant other than glycerin is not limited. Examples of the humectant include lower alcohol such as methyl alcohol, ethyl alcohol, n-propyl alcohol, isopropyl alcohol, n-butyl alcohol, sec-butyl alcohol, tert-butyl alcohol, and the like; amide such as dimethylformamide, dimethylacetamide, and the like; ketone such as acetone, and the like; ketoalcohol such as diacetone alcohol, and the like; ether such as tetrahydrofuran, dioxane, and the like; polyalcohol such as polyalkylene glycol, alkylene glycol, and the like; 2-pyrrolidone; N-methyl-2-pyrrolidone; 1,3-dimethyl-2-imidazolidinone; and the like. The polyalkylene glycol is not limited and examples thereof include polyethylene glycol, polypropylene glycol, and the like. The alkylene glycol is not limited and examples thereof include ethylene glycol, propylene glycol, butylene glycol, diethylene glycol, triethylene glycol, dipropylene glycol, tripropylene glycol, thiodiglycol, hexylene glycol, and the like. Among them, polyalcohol such as alkylene glycol is preferable. One of the humectants other than glycerin may be used alone or two or more of them may be used in combination.

The water-based ink for ink-jet recording comprises dipropylene glycol propyl ether (DPP) as the penetrant. As described above, the amount of DPP relative to the total amount of ink is in the range of about 2.0 wt % to about 3.0 wt %.

The penetrant may be composed of the DPP only or further may comprise other penetrants as long as it does not undermine the advantage of the present invention.

The penetrant other than the DPP is not limited. Examples of the penetrant include ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol butyl ether, tripropylene glycol methyl ether, tripropylene glycol ethyl ether, tripropylene glycol propyl ether, tripropylene glycol butyl ether, and the like. One of the penetrants other than the DPP may be used alone or two or more of them may be used in combination.

The acetylene glycol surfactant is not limited. As described above, the acetylene glycol surfactant may be an acetylene glycol surfactant represented by the general formula (1). In the general formula (1), the m and n may be the same or different. The m and n are the numbers that satisfy m+n=1 to 15, and m+n=3 to 11. $R_1$, $R_2$, $R_3$, and $R_4$ may be the same or different and are straight chain or branched-chain alkyl groups having 1 to 5 carbon atoms. The alkyl group includes, for example, a methyl group, an ethyl group, a propyl group, an isopropyl group, a butyl group, and the like.

The acetylene glycol surfactant may be a commercially available surfactant, for example. Examples of the commercially available surfactant include OLFIN® E1010, OLFIN® E1004, SURFYNOL® 440, and SURFYNOL® 465 manufactured by Nissin Chemical Industry Co., Ltd.; and Acetyrenol® E40 and Acetyrenol® E100 manufactured by Kawaken Fine Chemicals Co., Ltd.

As described above, the amount of the acetylene glycol surfactant relative to the total amount of the ink is in the range of about 0.1 wt % to about 0.3 wt %. Setting of the amount of the surfactant in the aforementioned range makes it possible to obtain an ink good in ejection stability.

The water-based ink for ink-jet recording may comprise surfactant other than the acetylene glycol surfactant as long as it does not undermine the advantage of the present invention. The surfactant other than the acetylene glycol surfactant is not limited. Examples of the surfactant include anionic surfactants manufactured by Kao Corporation such as EMAL® series, LATEMUL® series, VENOL® series, NEOPELEX® series, NS SOAP, KS SOAP, OS SOAP, PELEX® series, and the like. Examples of the surfactant also include anionic surfactants manufactured by Lion Corporation such as LIPOLAN® series, LIPON® series, SUNNOL® series, LIPOTAC® series, ENAGICOL® series, LIPAL® series, LOTAT® series, and the like. Furthermore, examples of the surfactant include nonionic surfactants manufactured by Kao Corporation such as EMULGEN® series, RHEODOL® series, EMASOL® series, EXCEL® series, EMANON® series, AMIET® series, AMINON® series, and the like. Examples of the surfactant further include nonionic surfactants manufactured by Lion Corporation such as DOBANOX® series, LEOCOL® series, LEOX® series, LAOL® series, LEOCON® series, LIONOL® series, CADENAX® series, LIONON® series, LEOFAT® series, and the like. One of the surfactants other than the acetylene glycol surfactant may be used alone or two or more of them may be used in combination.

The water-based ink for ink-jet recording may further comprise a conventionally known additive as required. Examples of the additive include a viscosity modifier, a surface tension modifier, and a mildew-proofing agent. The viscosity modifier is not limited and examples thereof include polyvinyl alcohol, cellulose, water-soluble resin, and the like.

The water-based ink for ink-jet recording may be prepared, for example, by uniformly mixing the self-dispersing pigment, water, the water-soluble organic solvent, and the acetylene glycol surfactant with other added components as required by a conventionally known method, and then removing insolubles with a filter or the like.

An ink cartridge comprises the water-based ink for ink-jet recording. As a body of the ink cartridge, for example, a conventionally known body may be used.

Next, an ink-jet recording apparatus is explained. The ink-jet recording apparatus comprises the ink cartridge and an ink ejection unit, and the water-based ink comprised in the ink cartridge is ejected from the ink ejection unit. Other than this, the ink-jet recording apparatus may have the construction similar to that of a conventionally known ink-jet recording apparatus.

FIG. 1 shows a construction of an example of the ink-jet recording apparatus. As shown in FIG. 1, the ink-jet recording apparatus 1 comprises four ink cartridges 2, an ink-jet head 3, a head unit 4, a carriage 5, a drive unit 6, a platen roller 7, and a purge unit 8 as main constructional elements. In the ink-jet recording apparatus 1 of this example, the ink-jet head 3 is the ink ejection unit.

The four ink cartridges 2 each comprise water-based inks of yellow, magenta, cyan, and black. For example, the water-based black ink is the water-based ink for ink-jet recording. The ink-jet head 3 performs printing on a recording material P such as a recording paper. The head unit 4 is provided with the ink-jet head 3. The four ink cartridges 2 and the head unit 4 are mounted to the carriage 5. The drive unit 6 reciprocates the carriage 5 in a straight line. The platen roller 7 extends in a reciprocating direction of the carriage 5 and opposes to the ink-jet head 3.

The drive unit 6 comprises a carriage shaft 9, a guide plate 10, a pair of pulleys 11 and 12, and an endless belt 13. The carriage shaft 9 is disposed at a lower end portion of the carriage 5 and extends in parallel to the platen roller 7. The guide plate 10 is disposed at an upper end portion of the carriage 5 and extends in parallel to the carriage shaft 9. The pulleys 11 and 12 are disposed in positions corresponding to both end portions of the carriage shaft 9 and between the carriage shaft 9 and the guide plate 10. The endless belt 13 is stretched between the pulleys 11 and 12.

In the ink-jet recording apparatus 1, as the pulley 11 is rotated in normal and reverse directions by the drive of a carriage motor 101, the carriage 5 which is connected to the endless belt 13 is reciprocated linearly along the carriage shaft 9 and the guide plate 10 in accordance with the rotation of the pulley 11.

The recording material P is fed from a paper feeding cassette (not shown) positioned on a side of or underneath the ink-jet recording apparatus 1. The recording material P is introduced between the ink-jet head 3 and the platen roller 7. Then, a predetermined printing is performed on the recording material P with the ink ejected from the ink-jet head 3. The recording material P then is discharged from the ink-jet recording apparatus 1. In FIG. 1, a feeding mechanism and a discharging mechanism of the recording material P are not shown.

The purge unit 8 is provided on a side of the platen roller 7. The purge unit 8 is disposed so as to oppose the ink-jet head 3 when the head unit 4 is in a reset position (above the purge unit 8 in this example). The purge unit 8 comprises a purge cap 14, a pump 15, a cam 16, and an ink reservoir 17. The purge cap 14 covers a plurality of nozzles (not shown) of the ink-jet head 3 when the head unit 4 is in a reset position. In this state, the pump 15 draws poor ink comprising, for example, air bubbles trapped inside the ink-jet head 3, by being driven by the cam 16. Thereby a recovery of the ink-jet head 3 is promoted. The drawn poor ink is stored in the ink reservoir 17.

A wiper member 20 is provided on the side of the platen roller 7 in the purge unit 8. The wiper member 20 has a spatula shape, and wipes a nozzle surface of the ink-jet head 3 in accordance with the movement of the carriage 5. In FIG. 1, in order to prevent the ink from drying, a cap 18 covers the plurality of nozzles of the ink-jet head 3 that returns to the reset position after the completion of printing.

With respect to the ink-jet recording apparatus 1 of this example, the four ink cartridges 2 are mounted to one carriage 5. With respect to the ink-jet recording apparatus, the four ink cartridges may be mounted to a plurality of carriages. Further, the four ink cartridges may not be mounted to the carriage, but may be provided and fixed in the ink-jet recording apparatus. In this state, for example, the ink cartridge and the head unit mounted to the carriage are connected via a tube, or the like, and the ink is supplied to the head unit from the ink cartridge.

EXAMPLES

Examples of the present invention are described together with Comparative Examples, which are provided for illustrative purposes only. The present invention is not limited by the following Examples and Comparative Examples.

Examples 1 to 3 and Comparative Examples 1 to 14

An ink composition (Tables 1 to 5) was stirred and then mixed. Thereafter, the mixture was filtered with a hydrophilic celluloseacetate type membrane filter having a pore diameter of 3.0 μm manufactured by ToyoRoshi Kaisha, Ltd. to produce each water-based ink, and thereby obtained the water-based ink of Examples 1 to 3 and Comparative Examples 1 to 14.

With respect to the water-based ink of each Example and Comparative Example, (a) printing quality evaluation (OD value), (b) printing quality evaluation (bleeding), (c) evaporation characteristic evaluation, (d) rubber deposition evaluation, (e) ejection stability evaluation, and (f) comprehensive evaluation were carried out with the following method.

(a) Printing Quality Evaluation (OD Value)

Using a digital multi-function center DCP-330C, which mounted an ink-jet printer, manufactured by Brother Industries, Ltd., on a high quality plain paper BP60PA manufactured by Brother Industries, Ltd., an evaluation sample was made by printing a 100% coverage solid image with a resolution of 600 dpi×600 dpi. An optical density (OD) value of the evaluation sample was measured by a spectrophotometer, Spectrolino, manufactured by Gretag-Macbeth (light source: $D_{50}$; observer: 2°; and status T). In this state, the larger the OD value is, the better the printing quality.

Printing Quality Evaluation (OD Value) Criteria

G: OD value is 1.35 or more

NG: OD value is less than 1.35

(b) Printing Quality Evaluation (Bleeding)

Using the digital multi-function center DCP-330C, on a high quality plain paper BP60PA, an evaluation sample was printed with a water-based yellow ink contained in an ink cartridge LC10Y manufactured by Brother Industries, Ltd. for background and with the water-based ink of each Example and Comparative Example for lines. Rag of border between the aforementioned water-based yellow ink and the water-based ink of each Example and Comparative Example was measured by a method according to ISO13660. In this state, the Rag is a raggedness of a line defined by ISO13660 and a ragged line indicates a state in which a line is rippled relative to an ideal line edge that supposed to be smooth and straight. From the obtained Rag, an evaluation was carried out according to the following Evaluation Criteria.

Printing Quality Evaluation (Bleeding) Criteria
G: Rag of the line is less than 18
NG: Rag of the line is 18 or more (c) Evaporation Characteristic Evaluation 5 g of the water-based ink was poured into an open bottle (with a bore diameter of 20.2 mm). The open bottle was stored for three days in a thermostatic chamber of 60° C. and of 40% relative humidity. After the storage, the water-based ink in the open bottle was visually observed and evaluated according to the following Evaluation Criteria.

Evaporation Characteristic Evaluation Criteria
G: Flowable (water-based ink was flowed when open bottle was tilted)
NG: Unflowable (water-based ink was not flowed when open bottle was tilted)

(d) Rubber Deposition Evaluation

A rubber piece (ethylene-propylene rubber (EPDM); rubber hardness (measured by old JIS K 6301 A type) 40°) was soaked in 100 g of the water-based ink and stored for a week under an environment of 70° C. in a condition where a contact area of the rubber piece per gram of water-based ink is 30 mm². After storage, the rubber piece was taken out of the water-based ink. Then, the remaining water-based ink in the container was filtrated with a celluloseacetate type membrane filter (with a pore diameter of 0.8 μm and a diameter of 15 mm) manufactured by ToyoRoshi Kaisha, Ltd. Further, the time required for filtration was measured. As a control, 100 g of the water-based ink before storage was filtrated under the same condition and the time required for filtration was measured. Next, an increase rate of filtration time was obtained with the following formula (I) and rubber deposition was evaluated according to the following Evaluation Criteria.

Increase rate of filtration time: Y/X    (I)

X: Filtration time before storage
Y: Filtration time after storage

Rubber Deposition Evaluation Criteria
G: Increase rate of filtration time is less than 1.3 times
NG: Increase rate of filtration time is 1.3 times or more (e) Ejection Stability Evaluation Using the digital multi-function center DCP-330C, on a high quality plain paper BP60PA, 20 sheets of evaluation sample were made by printing a solid image of 100% coverage with a resolution of 600 dpi×600 dpi. Presence or absence of poor printing (unejection and random ejection) in the evaluation sample was visually observed.

Ejection Stability Evaluation Criteria
G: Poor printing was not found
NG: Poor printing was found (f) Comprehensive Evaluation With respect to each water-based ink of Examples and Comparative Examples, from the results of (a) to (e), the comprehensive evaluation was carried out according to the following Evaluation Criteria.

Comprehensive Evaluation Criteria
G: all evaluation results were "G"
NG: "NG" was found in one or more of the evaluation results Ink compositions and evaluation results of the water-based ink of each Example and Comparative Example are summarized in Tables 1 to 5.

TABLE 1

|  | Example 1 | Example 2 | Example 3 |
|---|---|---|---|
| INK COMPOSITION (wt %) | | | |
| CAB-O-JET ® 300 (1*) | 26.7 (4.0) | 25.0 (3.8) | 30.0 (4.5) |
| Glycerin | 23.0 | 19.0 | 15.0 |
| Dipropylene glycol propyl ether | 2.2 | 3.0 | 2.0 |
| OLFIN ® E1010 (2*) | 0.2 | 0.1 | 0.3 |
| Water | Balance | Balance | Balance |
| EVALUATION | | | |
| Printing Quality Evaluation (OD value) | G | G | G |
| Printing Quality Evaluation (Bleeding) | G | G | G |
| Evaporation Characteristic Evaluation | G | G | G |
| Rubber Deposition Evaluation | G | G | G |
| Ejection Stability Evaluation | G | G | G |
| Comprehensive Evaluation | G | G | G |

(1*) self-dispersing black pigment manufactured by Cabot Specialty Chemicals, Inc., pigment solid content: 15 wt %
(2*) acetylene glycol surfactant manufactured by Nissin Chemical Industry Co., Ltd.
*numeric value in ( ) of CAB-O-JET ® 300 indicates a carbon black concentration (solid content) in a total amount of the ink

TABLE 2

|  | Comparative Example 1 | Comparative Example 2 | Comparative Example 3 | Comparative Example 4 |
|---|---|---|---|---|
| INK COMPOSITION (wt %) | | | | |
| CAB-O-JET ® 300 (1*) | 20.0 (3.0) | 36.7 (5.5) | 26.7 (4.0) | 26.7 (4.0) |
| Glycerin | 25.0 | 15.0 | 12.0 | 35.0 |
| Dipropylene glycol propyl ether | 2.5 | 2.5 | 2.8 | 2.2 |
| OLFIN ® E1010 (2*) | 0.2 | 0.2 | 0.2 | 0.2 |
| Water | Balance | Balance | Balance | Balance |
| EVALUATION | | | | |
| Printing Quality Evaluation (OD value) | NG | G | G | G |
| Printing Quality Evaluation (Bleeding) | G | G | G | G |
| Evaporation Characteristic Evaluation | G | NG | NG | G |
| Rubber Deposition Evaluation | G | G | G | G |
| Ejection Stability Evaluation | G | G | NG | NG |
| Comprehensive Evaluation | NG | NG | NG | NG |

(1*) self-dispersing black pigment manufactured by Cabot Specialty Chemicals, Inc., pigment solid content: 15 wt %
(2*) acetylene glycol surfactant manufactured by Nissin Chemical Industry Co., Ltd.
*numeric value in ( ) of CAB-O-JET ® 300 indicates a carbon black concentration (solid content) in a total amount of the ink

TABLE 3

|  | Comparative Example 5 | Comparative Example 6 | Comparative Example 7 | Comparative Example 8 |
|---|---|---|---|---|
| INK COMPOSITION (wt %) | | | | |
| CAB-O-JET ® 300 (1*) | 26.7 (4.0) | 26.7 (4.0) | 26.7 (4.0) | 26.7 (4.0) |
| Glycerin | 23.0 | 18.0 | 20.0 | 18.0 |
| Dipropylene glycol propyl ether | 1.0 | 4.0 | 2.0 | 2.8 |

TABLE 3-continued

|  | Comparative Example 5 | Comparative Example 6 | Comparative Example 7 | Comparative Example 8 |
|---|---|---|---|---|
| OLFIN ® E1010 (2*) | 0.1 | 0.3 | — | 0.8 |
| Water | Balance | Balance | Balance | Balance |
| EVALUATION |  |  |  |  |
| Printing Quality Evaluation (OD value) | G | G | G | G |
| Printing Quality Evaluation (Bleeding) | NG | G | NG | G |
| Evaporation Characteristic Evaluation | G | G | G | G |
| Rubber Deposition Evaluation | G | NG | G | NG |
| Ejection Stability Evaluation | NG | G | NG | NG |
| Comprehensive Evaluation | NG | NG | NG | NG |

(1*) self-dispersing black pigment manufactured by Cabot Specialty Chemicals, Inc., pigment solid content: 15 wt %
(2*) acetylene glycol surfactant manufactured by Nissin Chemical Industry Co., Ltd.
*numeric value in ( ) of CAB-O-JET ® 300 indicates a carbon black concentration (solid content) in a total amount of the ink

TABLE 4

|  | Comparative Example 9 | Comparative Example 10 | Comparative Example 11 | Comparative Example 12 |
|---|---|---|---|---|
| INK COMPOSITION (wt %) |  |  |  |  |
| CAB-O-JET ® 300 (1*) | 26.7 (4.0) | 26.7 (4.0) | 26.7 (4.0) | 26.7 (4.0) |
| Glycerin | 15.0 | 15.0 | 23.0 | 23.0 |
| Dipropylene glycol propyl ether | — | — | 2.2 | 2.2 |
| Triethylene glycol butyl ether | 5.0 | — | — | — |
| Dipropylene glycol methyl ether | — | 5.0 | — | — |
| EMULGEN ® 105 (3*) | — | — | 0.2 | — |
| EMULGEN ® 420 (4*) | — | — | — | 0.2 |
| Water | Balance | Balance | Balance | Balance |
| EVALUATION |  |  |  |  |
| Printing Quality Evaluation (OD value) | G | G | G | G |
| Printing Quality Evaluation (Bleeding) | G | G | G | NG |
| Evaporation Characteristic Evaluation | G | G | NG | G |
| Rubber Deposition Evaluation | NG | NG | NG | G |
| Ejection Stability Evaluation | G | G | G | G |
| Comprehensive Evaluation | NG | NG | NG | NG |

(1*) self-dispersing black pigment manufactured by Cabot Specialty Chemicals, Inc., pigment solid content: 15 wt %
(3*) polyoxyethylene lauryl ether manufactured by Kao Corporation
(4*) polyoxyethylene oleyl ether manufactured by Kao Corporation
*numeric value in ( ) of CAB-O-JET ® 300 indicates a carbon black concentration (solid content) in a total amount of the ink

TABLE 5

|  | Comparative Example 13 | Comparative Example 14 |
|---|---|---|
| INK COMPOSITION (wt %) |  |  |
| CAB-O-JET ® 300 (1*) | 46.6 (7.0) | 46.6 (7.0) |
| Glycerin | 10.0 | 10.0 |
| Triethylene glycol butyl ether | 5.0 | — |
| Diethylene glycol | 10.0 | — |
| 1,5-pentanediol | — | 5.0 |
| Diethylene glycol butyl ether | — | 5.0 |
| OLFIN ® E1010(2*) | 1.0 | 2.0 |
| 1,3-dimethyl-2-imidazoline | 4.0 | 4.0 |
| Triethanol amine | 0.9 | 0.9 |
| Water | Balance | Balance |
| EVALUATION |  |  |
| Printing Quality Evaluation (OD value) | G | G |
| Printing Quality Evaluation (Bleeding) | G | G |
| Evaporation Characteristic Evaluation | G | G |
| Rubber Deposition Evaluation | NG | NG |
| Ejection Stability Evaluation | G | G |
| Comprehensive Evaluation | NG | NG |

(1*) self-dispersing black pigment manufactured by Cabot Specialty Chemicals, Inc., pigment solid content: 15 wt %
(2*) acetylene glycol surfactant manufactured by Nissin Chemical Industry Co., Ltd.
*numeric value in ( ) of CAB-O-JET ® 300 indicates a carbon black concentration (solid content) in a total amount of the ink As summarized in Table 1, each water-based ink of Examples 1 to 3 was good in all results of the printing quality evaluation (OD value), the printing quality evaluation (bleeding), the evaporation characteristic evaluation, the rubber deposition evaluation, and the ejection stability evaluation. In contrast, as summarized in Tables 2 to 5, the water-based ink of Comparative Example 1 having a small amount of the self-dispersing pigment (solid content) was inferior in the result of the printing quality evaluation (OD value). The water-based ink of Comparative Example 2 having a large amount of the self-dispersing pigment (solid content) was inferior in the result of the evaporation characteristic evaluation. The water-based ink of Comparative Example 3 having a small amount of glycerin was inferior in the results of the evaporation characteristic evaluation and the ejection stability evaluation. The water-based ink of Comparative Example 4 having a large amount of glycerin was inferior in the result of the ejection stability evaluation. The water-based ink of Comparative Example 5 having a small amount of DPP was inferior in the results of the printing quality evaluation (bleeding) and the ejection stability evaluation. The water-based ink of Comparative Example 6 having a large amount of DPP was inferior in the result of the rubber deposition evaluation. The water-based ink of Comparative Example 7 that does not comprise the acetylene glycol surfactant was inferior in the results of the printing quality evaluation (bleeding) and the ejection stability evaluation. The water-based ink of Comparative Example 8 having a large amount of the acetylene glycol surfactant was inferior in the results of the rubber deposition evaluation and the ejection stability evaluation. Each water-based ink of Comparative Examples 9 and 10 that does not comprise DPP and the acetylene glycol surfactant could obtain the printing quality evaluation (bleeding) equivalent to a water-based ink that comprises appropriate quantities of DPP because the water-based ink of Comparative Examples 9 and 10 comprises 5.0 wt % of triethylene glycol butyl ether or dipropylene glycol methyl ether. However, each water-based ink of Comparative Examples 9 and 10 was inferior in the rubber deposition evaluation due to triethylene glycol butyl ether or dipropylene glycol methyl ether. The water-based ink of Comparative Example 11 that comprises polyoxyethylene lauryl ether (EMULGEN® 105) instead of the acetylene glycol surfactant (OLFIN® E1010) was inferior in the results of the evaporation characteristic evaluation and the rubber deposition evaluation. Similarly, the water-based ink of Comparative Example 12 that comprises polyoxyethylene oleyl ether (EMULGEN® 420) instead of the acetylene glycol surfactant (OLFIN® E1010) was inferior in the printing quality evaluation (bleeding). Each water-based ink of Comparative Examples 13 and 14 having a large amount of the self-dispersing pigment (solid content) and the acetylene glycol surfactant, having a small amount of glycerin, and not comprising DPP was inferior in the result of the rubber deposition evaluation due to triethylene glycol butyl ether or diethylene glycol butyl ether added to the water-based ink instead of the DPP.

It will be obvious to those having skill in the art that many changes may be made in the above-described details of the particular aspects described herein without departing from the spirit or scope of the invention as defined in the appended claims.

What is claimed is:

1. A water-based ink for ink-jet recording comprising a self-dispersing pigment, water, a water-soluble organic solvent, and an acetylene glycol surfactant, wherein
   an amount of the self-dispersing pigment (solid content) relative to a total amount of the ink is in a range of about 3.5 wt % to about 4.5 wt %,
   the water-soluble organic solvent comprises glycerin and dipropylene glycol propyl ether, an amount of the glycerin relative to a total amount of the ink is in a range of about 15 wt % to about 25 wt %, and an amount of the dipropylene glycol propyl ether relative to a total amount of the ink is in a range of about 2.0 wt % to about 3.0 wt %,
   an amount of the acetylene glycol surfactant relative to a total amount of the ink is in a range of about 0.1 wt % to 0.3 wt %.

2. The water-based ink according to claim 1, wherein the acetylene glycol surfactant is an acetylene glycol surfactant represented by the following general formula (I)

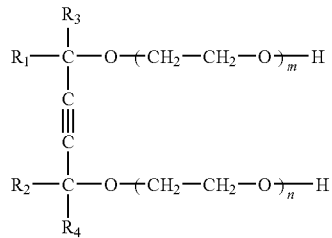

wherein in the general formula (I),
m and n may be the same or different and indicate numbers that satisfy m+n=1 to 15; and
$R_1$, $R_2$, $R_3$, and $R_4$ may be the same or different and are straight chain or branched-chain alkyl groups having 1 to 5 carbon atoms.

3. The water-based ink according to claim 1, wherein the ink is black ink.

4. An ink cartridge comprising a water-based ink according to claim 1.

5. An ink-jet recording apparatus comprising an ink cartridge according to claim 4 and an ink ejection unit, wherein a water-based ink comprised in the ink cartridge is ejected from the ink ejection unit.

6. The water-based ink according to claim 1,
wherein an amount of the self-dispersing pigment relative to a total amount of the ink is in a range of about 3.8 wt % to about 4.5 wt %,
wherein an amount of the glycerin relative to a total amount of the ink is in a range of about 15 wt % to about 23 wt %,
wherein an amount of the dipropylene glycol propyl ether relative to a total amount of the ink is in a range of about 2.0 wt % to about 3.0 wt %, and
wherein an amount of the acetylene glycol surfactant relative to a total amount of the ink is in a range of about 0.1 wt % to 0.3 wt %.

* * * * *